US009260257B2

(12) United States Patent
Stegemoeller et al.

(10) Patent No.: US 9,260,257 B2
(45) Date of Patent: Feb. 16, 2016

(54) METHODS AND SYSTEMS FOR MATERIAL TRANSFER

(71) Applicant: Halliburton Energy Services, Inc., Houston, TX (US)

(72) Inventors: Calvin L. Stegemoeller, Duncan, OK (US); Ed B. Hagan, Hastings, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/253,306

(22) Filed: Apr. 15, 2014

(65) Prior Publication Data

US 2014/0227075 A1  Aug. 14, 2014

Related U.S. Application Data

(62) Division of application No. 12/623,235, filed on Nov. 20, 2009, now Pat. No. 8,734,081.

(51) Int. Cl.
| | | |
|---|---|---|
| *B65G 65/32* | (2006.01) | |
| *B65D 88/32* | (2006.01) | |
| *B65D 88/54* | (2006.01) | |
| *B65G 63/00* | (2006.01) | |

(52) U.S. Cl.
CPC ............... *B65G 65/32* (2013.01); *B65D 88/32* (2013.01); *B65D 88/544* (2013.01); *B65G 63/008* (2013.01)

(58) Field of Classification Search
CPC ............. B01J 8/003; B01J 2208/00752; B01J 2208/00778; B01J 2208/00743; B01J 2208/00769; B60P 1/40; B60P 1/42; B65F 3/22; B65G 65/46; B65G 65/463; B65G 65/466
See application file for complete search history.

(56) References Cited

U.S. PATENT DOCUMENTS

| | | | |
|---|---|---|---|
| 2,618,374 | A | 6/1952 | Rahlson |
| 3,155,248 | A | 11/1964 | Haller |
| 3,406,844 | A | 10/1968 | Conover |
| 3,547,291 | A | 12/1970 | Batterton et al. |
| 3,687,319 | A | 8/1972 | Adam et al. |
| 3,792,790 | A | 2/1974 | Brubaker |
| 3,827,578 | A | 8/1974 | Hough |
| 3,934,739 | A | 1/1976 | Zumsteg et al. |
| 3,944,090 | A | 3/1976 | Flood |
| 4,163,626 | A | 8/1979 | Batterton et al. |

(Continued)

FOREIGN PATENT DOCUMENTS

| | | |
|---|---|---|
| CH | 410504 A | 3/1966 |
| EP | 0340380 A1 | 11/1989 |

(Continued)

OTHER PUBLICATIONS

International Search Report and Written Opinion issued in related International Patent Application No. PCT/GB2010/002137, mailed Mar. 24, 2011, 11 pages.

(Continued)

*Primary Examiner* — Glenn Myers
(74) *Attorney, Agent, or Firm* — John W. Wustenberg; Baker Botts L.L.P.

(57) ABSTRACT

A storage unit is disclosed. A first feed is disposed at least partially within the storage unit, and a second feed is coupled to the first feed. The second feed is configured to receive one or more materials and to transfer the one or more materials to the first feed. The first feed is configured to elevate the one or more materials to the storage unit.

5 Claims, 5 Drawing Sheets

(56) References Cited

U.S. PATENT DOCUMENTS

| | | |
|---|---|---|
| 4,187,047 A | 2/1980 | Squifflet |
| 4,465,420 A | 8/1984 | Dillman |
| 4,571,150 A | 2/1986 | Foster |
| 4,621,972 A | 11/1986 | Grotte |
| 4,634,335 A | 1/1987 | Van Den Pol |
| 4,701,095 A | 10/1987 | Berryman et al. |
| 4,715,721 A | 12/1987 | Walker et al. |
| 4,750,273 A | 6/1988 | Parkes et al. |
| 4,775,275 A | 10/1988 | Perry |
| 4,850,750 A | 7/1989 | Cogbill et al. |
| 5,102,281 A | 4/1992 | Handke |
| 5,180,272 A | 1/1993 | Campbell |
| 5,184,715 A * | 2/1993 | Feterl ............ 198/667 |
| 5,195,861 A | 3/1993 | Handke |
| 5,788,055 A * | 8/1998 | Stewart et al. ............ 198/671 |
| 5,904,365 A * | 5/1999 | Dillon ............ 280/419 |
| 5,906,471 A * | 5/1999 | Schwoerer ............ 414/505 |
| 6,474,926 B2 | 11/2002 | Weiss |
| 6,502,689 B2 | 1/2003 | Mitchell et al. |
| 6,948,535 B2 | 9/2005 | Stegemoeller |
| 7,048,432 B2 | 5/2006 | Phillippi et al. |
| 7,214,028 B2 | 5/2007 | Boasso |
| 7,735,365 B2 | 6/2010 | Crain et al. |
| 7,858,888 B2 | 12/2010 | Lucas et al. |
| 2003/0202869 A1 | 10/2003 | Posch |
| 2005/0155667 A1 | 7/2005 | Stegemoeller |
| 2006/0086592 A1* | 4/2006 | Olds ............ B65G 33/20 198/658 |
| 2007/0125543 A1 | 6/2007 | McNeel et al. |
| 2007/0125544 A1 | 6/2007 | Robinson et al. |
| 2007/0201305 A1 | 8/2007 | Heilman et al. |
| 2008/0264641 A1 | 10/2008 | Slabaugh et al. |
| 2009/0290970 A1* | 11/2009 | Farley et al. ............ 414/808 |
| 2010/0070144 A1* | 3/2010 | Burke et al. ............ 701/50 |

FOREIGN PATENT DOCUMENTS

| | | |
|---|---|---|
| FR | 2440843 A1 | 6/1980 |
| JP | 52159960 | 12/1977 |
| WO | 94/19263 A1 | 9/1994 |

OTHER PUBLICATIONS

U.S. Appl. No. 12/235,270, filed Sep. 22, 2008.
U.S. Appl. No. 12/494,457, filed Jun. 30, 2009.

\* cited by examiner

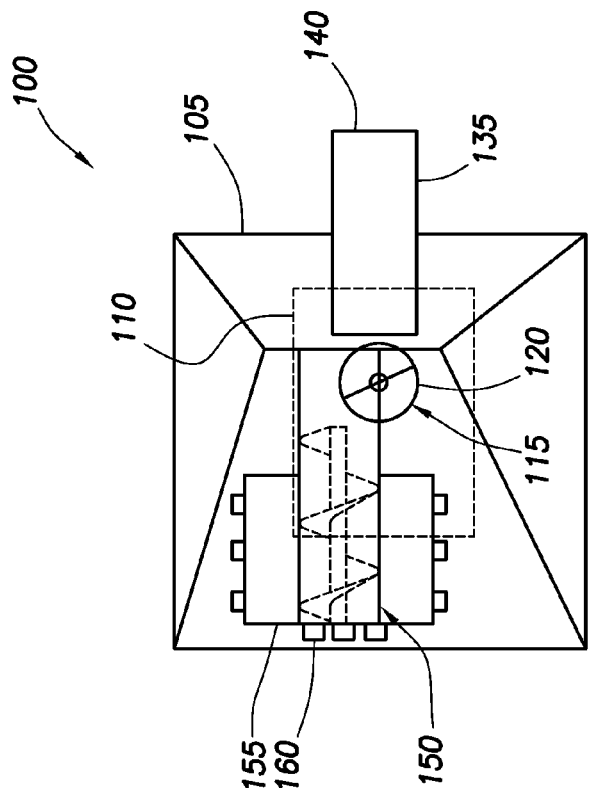
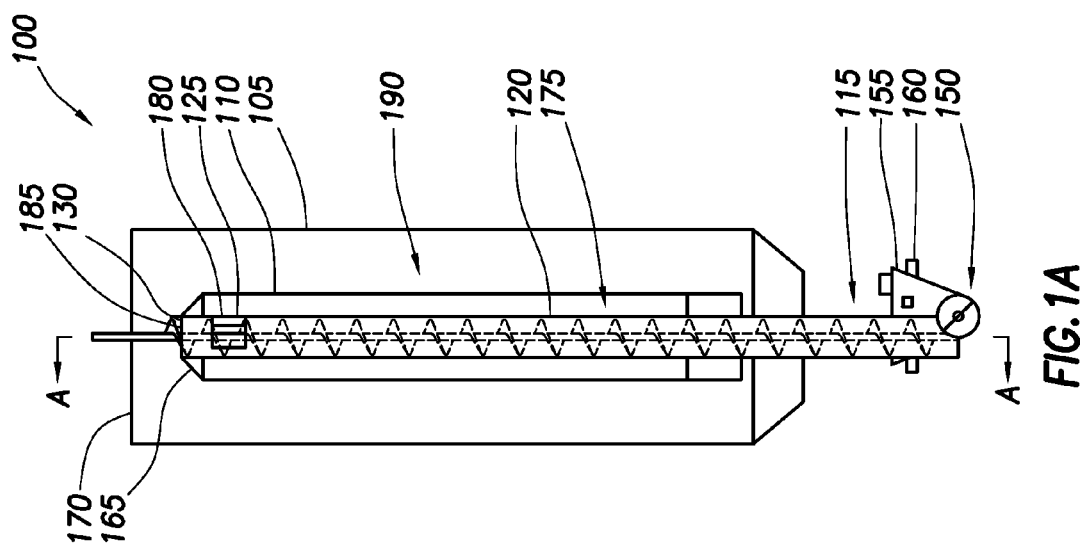

METHODS AND SYSTEMS FOR MATERIAL TRANSFER

CROSS REFERENCE TO RELATED APPLICATION

This application is a divisional of application Ser. No. 12/623,235, entitled "Improved Method and Systems for Material Transfer" and filed Nov. 20, 2009, which incorporated herein by reference for all purposes.

BACKGROUND

The present invention relates generally to oilfield operations, and more particularly, to methods and systems for material transfer.

Oilfield operations are conducted in a variety of different locations and may involve a variety of equipment. The requisite materials for the different operations are often hauled to and stored at a well site where the operations are to be performed. After delivery to the well site, some materials may be transferred to storage units. Much time and expense may be incurred by transferring materials to storage units at the well site.

In hydraulic fracturing operations, for example, proppant may be transferred to a horizontal storage unit, sometimes referred to as a "mountain mover" in the oilfield services industry. A horizontal storage unit may be positioned on a well site pad while the unit is empty. The horizontal storage unit may then be filled, via tractor-trailer proppant transport vehicles, for example. These transport vehicles may have a pneumatic conveying system to facilitate unloading a load of proppant at a particular rate. That rate may be limited by, among other things, the characteristics of proppant; proppant may include, for example, sand or other man-made granular materials and may not convey well in the vertical direction.

By way of example, a typical transport vehicle may unload 40,000 lbs (pounds) of proppant in approximately 30 minutes at an average of approximately 15 cf (cubic feet) per minute, while vertically elevating the proppant stream approximate 13 ft (feet). Additional time—approximately 15 minutes, for example—initially may be required to position and prepare the transport vehicle for unloading. The time required to disconnect the transport vehicle and drive away may add another 15 minutes. Thus, the entire proppant fill cycle may well extend to approximately 1 hour per 400 cf of proppant.

Moreover, there may not be sufficient space at the well site for multiple proppant transport vehicles to unload simultaneously. Thus, to fill a 2,300-cf storage bin may require 6 fill cycles and 6 hours with only one unit unloading at a time. As transport vehicles arrive at the well site, each may have to wait to unload in turn, and transport businesses may typically charge substantial stand-by fees for such waiting periods.

In the alternative, proppant may be transferred to a vertical storage unit. Filling a vertical storage unit may necessitate a conveying system to elevate the proppant vertically. Considering a 30-ft vertical elevation for a vertical storage unit instead of a 13-ft elevation discussed in the prior horizontal storage unit example, the discharge rate may be further limited to approximately 5 to 10 cf per minute. Hence, even if two transport vehicles unload simultaneously, the aggregate unloading rate may nonetheless be significantly lower than the unloading rate of approximately 15 cf per minute in the case of a horizontal storage unit. Expenses and inefficiencies resulting from limitations such those in the examples above are undesirable.

FIGURES

Some specific exemplary embodiments of the disclosure may be understood by referring, in part, to the following description and the accompanying drawings.

FIG. 1A is a partial cross-sectional side view of a storage unit in accordance with an exemplary embodiment of the present invention.

FIG. 1C is a partial cross-sectional bottom view of a storage unit corresponding to FIG. 1A.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention relates generally to oilfield operations, and more particularly, to methods and systems for material transfer.

In one aspect, a material storage system unit is disclosed as including a first feed and a second feed coupled to the first feed. The second feed is configured to receive one or more materials and to transfer the one or more materials to the first feed. The first feed is configured to elevate the one or more materials for transfer to one or more storage units.

In another aspect, a material storage system is disclosed. The material storage system includes a storage bin, a first screw feed and a second screw feed. The first screw feed has one or more outlets configured to direct one or more materials to the storage bin. The second screw feed has at least one outlet configured to direct the one or more materials to the first screw feed. An axis of the first screw feed is substantially vertical.

In another aspect, a method for transferring one or more materials to a storage unit is disclosed. The method includes loading a receptacle with one or more materials from one or more material transport vehicles. The method further includes elevating the one or more materials, at least in part, with a screw feed disposed at least partially within a storage unit. The method further includes transferring the one or more materials to the storage unit.

Accordingly, this disclosure provides improved methods and systems for material transfer that may enable increased unloading rates, increased efficiencies, and decreased expenses. The features and advantages of the present disclosure will be readily apparent to those skilled in the art upon a reading of the description of exemplary embodiments, which follows.

DESCRIPTION

The present invention relates generally to oilfield operations, and more particularly, to methods and systems for material transfer.

Figure 1B:
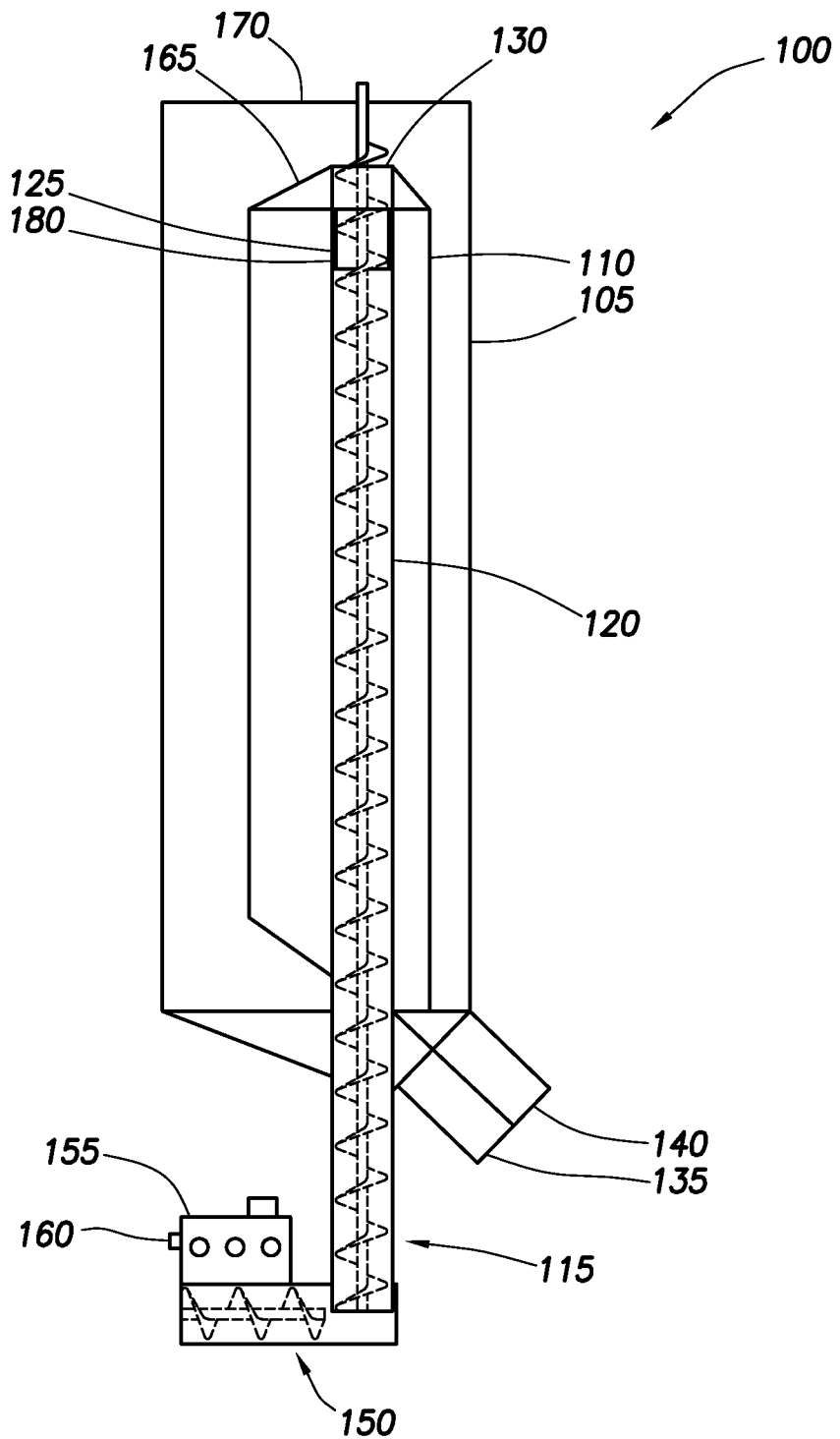
FIG. 1B is a partial cross-sectional view of a storage unit corresponding to section A-A of FIG. 1A.

FIGS. 1a, 1b and 1c (collectively referenced herein as FIG. 1) depict a storage unit 100 with a high-rate loading feature in accordance with an exemplary embodiment of the present disclosure. In certain embodiments, storage unit 100 may be used for storing proppant, sand, gel powder or other solid materials used in oilfield operations. In certain embodiments, storage unit 100 may be a mobile bin or silo configured for transport in a substantially horizontal position and erection in a substantially vertical position at a well site, thus reducing the amount of space required. Storage unit 100 may be may be a self-erecting storage unit as disclosed in U.S. patent application Ser. No. 12/235,270 filed Sep. 10, 2008, assigned to Halliburton Energy Services, Inc., which is incorporated by reference herein in its entirety. In the alternative, storage unit 100 may be a stationary unit, or any other suitable unit.

A vertical bin may require less than 50% of the well pad space of a horizontal storage bin of comparable capacity, thus allowing more space for multiple transport vehicles to unload simultaneously. While storage unit 100 is shown in FIG. 1 to be a substantially vertical storage bin, storage unit 100 may be disposed in other orientations such that storage unit 100 may not be substantially vertical. Also, as would be appreciated by those of ordinary skill in the art having the benefit of this disclosure, storage unit 100 may be a storage bin, a tank, or any other desirable storage unit.

Storage unit 100 may include outer bin 105 and inner bin 110. Outer bin 105 and inner bin 110 may be configured for storing the same material or different materials. For example, outer bin 105 may be configured for storing proppant of certain granular characteristics, grade, and/or composition, whereas inner bin 110 may be configured for storing proppant of a different granular characteristics, grade, and/or composition, as would be appreciated by one of ordinary skill in the art having the benefit of this disclosure. Outer bin 105 may be coupled to outer bin discharge chute 135, and inner bin 110 may be coupled to inner bin discharge chute 140. The one or more discharge chutes may include discharge outlets disposed at other locations, orientations, and other variations from that shown in FIG. 1.

Storage unit 100 may include vertical feed 115 configured to transfer material into one or more storage bins. In certain embodiments, vertical feed 115 may include, but not be limited to, an auger, screw feeder, screw conveyor, screw elevator, or another device which may be used to elevate material. For example, vertical feed 115 may alternatively include a bucket conveyor and belt loop mechanism adapted for use with storage unit 100, as would be understood by one of ordinary skill in the art having the benefit of this disclosure. Additionally, while vertical feed 115 is shown in FIG. 1 as disposed in a vertical orientation, the feeder may be disposed in any of a number of different orientations.

Outer bin 105, inner bin 110, vertical feed 115, and feeder housing 120 may be configured such that one or both bins are capable of being filled with material via vertical feed 115. It is to be understood that references herein to an inner bin may include embodiments of one or more inner bins. Vertical feed 115 may be disposed at least partially within inner bin 110 and outer bin 105. Vertical feed 115 may be integrated with one or both bins as a mobile unit that may be transported in a substantially horizontal position and then erected to a substantially vertical position at a well site.

In certain embodiments, portions of vertical feed 115 may extend beyond an upper surface 165 of inner bin 110 and/or upper surface 120 of outer bin 105. In other embodiments, portions of vertical feed 115 may not extend beyond upper surface 165 of inner bin 110 and/or upper surface 170 of outer bin 105. Vertical feed 115 may be at least partially enclosed by feeder housing 120. Feeder housing 120 may include housing opening 125 configured to allow material to pass from vertical feed 115 to interior 175 of inner bin 110. Feeder housing 120 may include housing opening 130 configured to allow material to pass from vertical feed 115 to interior 190 of outer bin 105. As shown in FIG. 1, upper surface 165 of inner bin 110 may be sloped to facilitate transfer of material from housing opening 130 to interior 190 of outer bin 105. One or both of housing openings 125 and 130 may be further configured to selectively open or close with, for example, a gate or valve mechanism 180. The gate or valve mechanism may be activated mechanically and/or via electrical signal either remotely or locally. One of ordinary skill in the art having the benefit of this disclosure would understand that various configurations could be employed to selectively open and/or close housing openings 125 and 130. Thus, in accordance with certain embodiments, material may be selectively transferred to one or more bins.

Vertical feed 115 may be coupled to horizontal feed 145. As would be appreciated by one of ordinary skill in the art having the benefit of this disclosure, in certain embodiments, horizontal feed 145 may include, but not be limited to, an auger, screw feeder, screw conveyor or other device which may be used to transfer material and may be disposed in orientations other than strictly horizontal. Horizontal feed 145 and vertical feed 115 may be particularly well adapted for supplying granular material, such as proppant, which may not convey well due to its granular characteristics. For example, proppant may have a tendency to slide when conveyed, especially when conveyed along an incline or in a vertical direction. Thus, horizontal feed 145 may be configured to transfer material to vertical feed 115 with sufficient force to avoid material back-up due to any tendency a material may have to resist elevation and slide down vertical feed 115.

Horizontal feed 145 may be coupled to collection box 155, which may include fill connections 160 that may include any inlet configured to receive material. Although FIG. 1 shows 6 fill connections, collection box 155 may include any number of connections. In alternative embodiments, a gravity-based approach may be employed in lieu of collection box 155 and horizontal feed 145, and a receptacle may be configured to receive material from one or more transport vehicles and facilitate material transfer to vertical feed 115 with sufficient force to avoid material back-up. For example, a sloped gravity enclosure may be employed.

In accordance with certain embodiments of the present disclosure, storage unit 100 may be configured so that, for example, one or more conveying systems may connect to collection box 155. Such conveying systems may be part of one or more transport vehicles with integral pneumatic conveying systems, for example. After connecting, the transport vehicles may begin unloading at increased rates. One exemplary estimated unloading rate may be approximately 30 cf per minute, which may be enhanced by the horizontal discharge layout. The horizontal discharge layout, which may include collection box 155, fill connections 160, and horizontal feed 145, may render vertical conveying unnecessary and may be configured to receive material and transfer the material to vertical feed 115.

After vertical feed 115 has received material by way of horizontal feed 145, vertical feed 115 may then elevate the material to one or more openings in auger housing 120. For example, vertical feed 115 may elevate the material to housing opening 125, where gate 180 may be opened to allow material to pass to the interior of inner bin 110. At some point, the gate may be closed so that vertical feed 115 may elevate material to housing opening 130. Housing opening 130 may also have an opened gate 185, allowing material to pass to interior 190 of outer bin 105.

As would be appreciated by those of ordinary skill in the art, the different equipment used in the embodiments disclosed herein may be powered by any suitable power source. For example, but not by way of limitation, the equipment may be powered by a combustion engine, electric power supply which may be provided by an on-site generator or by a hydraulic power supply.

Figure 2:
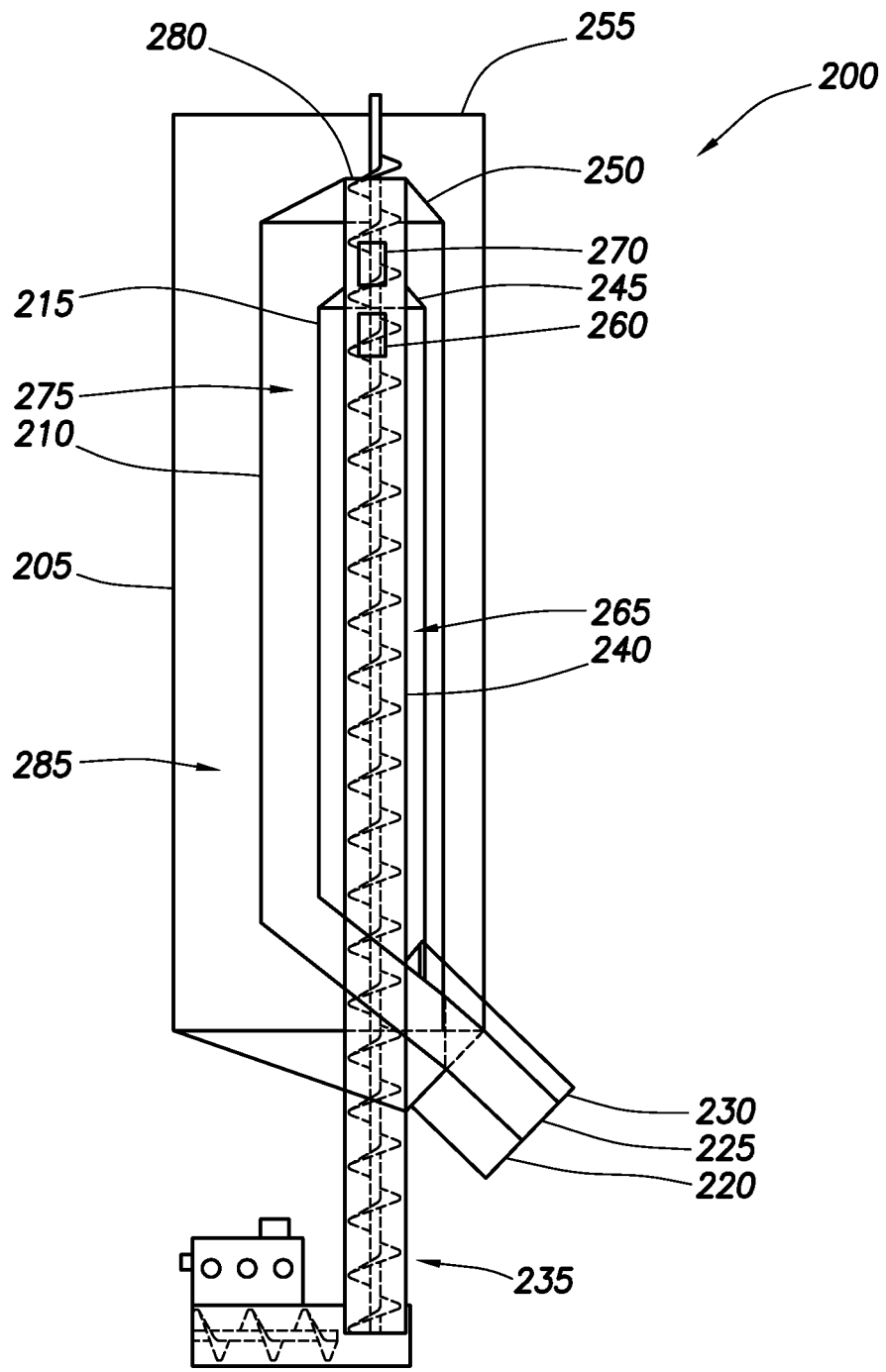
FIG. 2 is a partial cross-sectional side view of a storage unit in accordance with an exemplary embodiment of the present invention.

FIG. 2 shows a storage unit 200 that is similar to storage unit 100, but adapted for multiple interior bins. Storage unit 200 may include outer bin 205, intermediate bin 210, and innermost bin 215. Each of bins 205, 210 and 215 may be configured for storing proppant of different or the same granular characteristics, grade, and/or composition. With the benefit of this disclose, one of ordinary skill in the art would understand that alternative embodiments may implement a greater number of interior bins.

Storage unit 200 may include vertical feed 235 configured to transfer material into one or more of bins 205, 210 and 215. Bins 205, 210 and 215, vertical feed 235, and feeder housing 240 may be configured such that one or more of the bins are capable of being filled with material via vertical feed 235. As with storage unit 100, certain embodiments of storage unit 200 may include portions of vertical feed 235 that may extend beyond upper surface 245 of innermost bin 215, upper surface 250 of intermediate bin 210, and/or upper surface 255 of outer bin 205.

Feeder housing 240 may include inner bin fill port 260 configured to allow material to pass from vertical feed 235 to interior 265 of innermost bin 215. Feeder housing 240 may further include intermediate bin fill port 270 configured to allow material to pass from vertical feed 235 to interior 275 of intermediate bin 210. Feeder housing 240 may further include outer bin fill port 280 configured to allow material to pass from vertical feed 235 to interior 285 of outer bin 205. One or more of fill ports 260, 270 and 280 may be further configured to selectively open or close with, for example, a gate or valve mechanism (not shown).

Outer bin 205 may be coupled to outer bin outlet 220. Intermediate bin 210 may be coupled to intermediate bin outlet 225. Innermost bin 215 may be coupled to innermost bin outlet 230. In other respects, certain embodiments of storage unit 200 may be similar to storage unit 100.

Figure 3B:
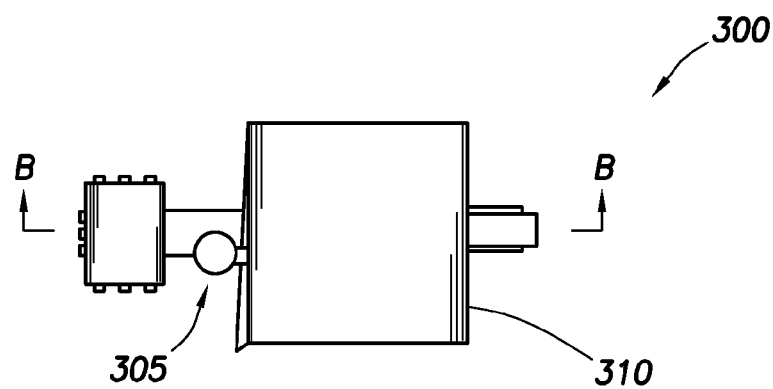
FIG. 3B is a top view of a storage unit corresponding to FIG. 3A.
Figure 3A:
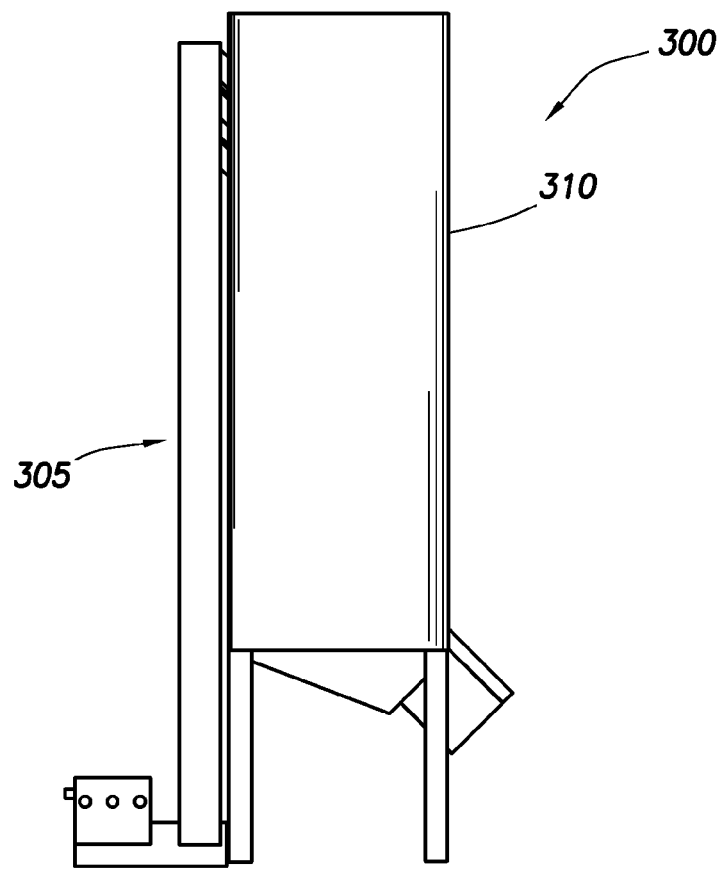
FIG. 3A is a side view of a storage unit in accordance with an exemplary embodiment of the present invention.
Figure 3C:
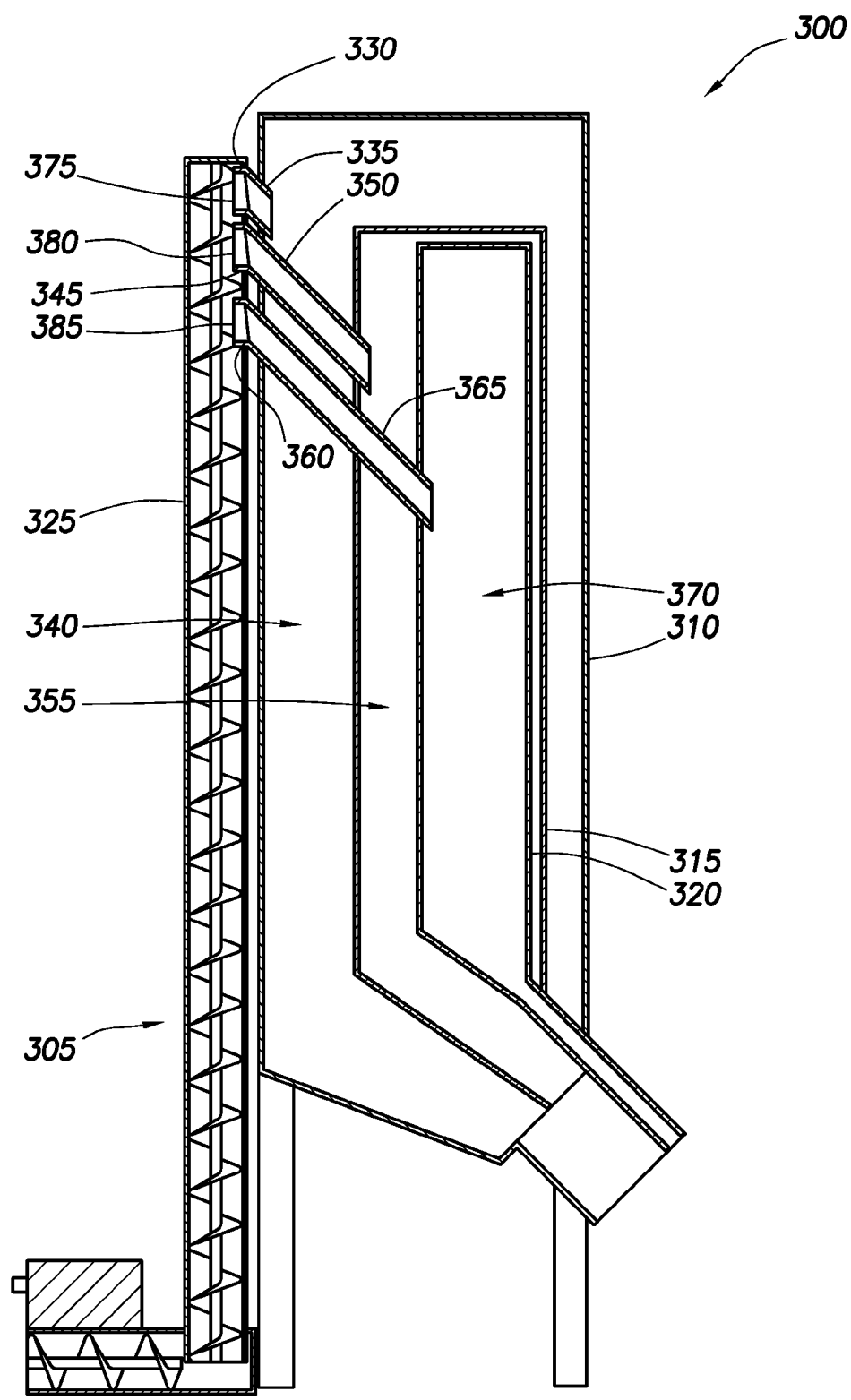
FIG. 3C is a cross-sectional view of a storage unit corresponding to section B-B of FIG. 3B.

In certain embodiments, a material storage system may include a vertical feed exterior to one or more storage bins and adapted to transfer material to an interior of one or more bins. FIGS. 3A, 3B and 3C show a material storage system 300 that, similar to storage unit 200, is adapted for multiple interior bins, but is further adapted so that vertical feed 305 is exterior to outer bin 310. Vertical feed 305 may be configured to transfer material into one or more of bins 310, 315 and 320. Bins 310, 315 and 320, vertical feed 305, and feeder housing 325 may be configured such that one or more of the bins are capable of being filled with material via vertical feed 305. Feeder housing 325 may include outer bin fill port 330 configured to allow material to pass from vertical feed 305 through channel 335 to interior 340 of outer bin 310. Feeder housing 325 may further include intermediate bin fill port 345 configured to allow material to pass from vertical feed 305 through channel 350 to interior 355 of intermediate bin 315. Feeder housing 325 may further include innermost bin fill port 360 configured to allow material to pass from vertical feed 305 through channel 365 to interior 370 of innermost bin 320. One or more of fill ports 330, 345 and 360 may be further configured to selectively open or close with, for example, a gate or valve mechanisms 375, 380 and 385. In other respects, certain embodiments of material storage system 300 may be similar to storage units 100 and/or 200.

Accordingly, this disclosure provides improved methods and systems for material transfer that may enable increased unloading rates, increased efficiencies, and decreased expenses. By way of example with storage unit 100, an exemplary filling rate of 100 cf per minute or greater may be possible by employing vertical feed 115. Without the need to elevate material as it is unloaded, a typical pneumatic conveying system may be capable of 20 to 30 cf per minute or greater. By unloading 4 transport vehicles simultaneously, for example, an aggregate filling rate of 100 cf per minute or greater may be achieved.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method for transferring one or more materials to a storage unit, the method comprising:
    loading a receptacle with one or more materials from one or more material transport vehicles;
    elevating the one or more materials, at least in part, with a screw feed disposed at least partially within the storage unit, wherein the storage unit includes an outer bin and an inner bin at least partially disposed within the outer bin; and
    selectively transferring the one or more materials into the inner bin through a first opening of the screw feed and into the outer bin in an area external to the inner bin through a second opening of the screw feed.

2. The method of claim 1, comprising:
    transferring the one or more materials from the receptacle to the screw feed, at least in part, with a second screw feed.

3. The method of claim 1, wherein an axis of the screw feed is substantially vertical.

4. The method of claim 2, wherein an axis of the second screw feed is substantially horizontal.

5. The method of claim 1, wherein at least the screw feed and the storage unit are transportable as a single unit.

* * * * *